V. AHLGREN.
COUNTERSINK.
APPLICATION FILED MAY 6, 1916.
1,229,565.
Patented June 12, 1917.
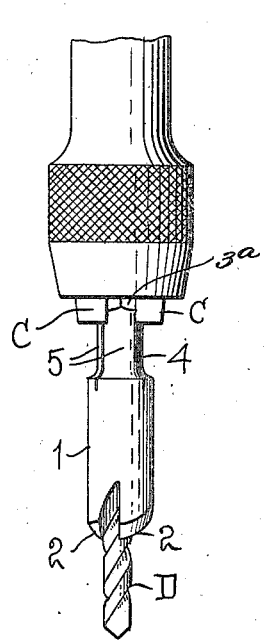
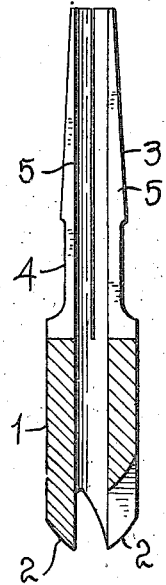
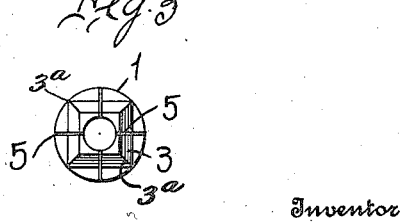
Inventor
VICTOR AHLGREN
By Watson E. Coleman
Attorney

UNITED STATES PATENT OFFICE.

VICTOR AHLGREN, OF EAST ROCKFORD, ILLINOIS.

COUNTERSINK.

1,229,565.           Specification of Letters Patent.    Patented June 12, 1917.

Application filed May 6, 1916. Serial No. 95,915.

*To all whom it may concern:*

Be it known that I, VICTOR AHLGREN, a citizen of the United States, residing at East Rockford, in the county of Winnebago and State of Illinois, have invented certain new and useful Improvements in Countersinks, of which the following is a specification, reference being had to the accompanying drawings.

This invention relates to certain improvements in counter-sinks and it is an object of the invention to provide a device of this general character having novel and improved means whereby the same may be effectively applied in position upon a drill and whereby the counter-sink and drill may be effectively clamped within a brace at a single operation.

The invention consists in the details of construction and in the combination and arrangement of the several parts of my improved counter-sink whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is an elevational view illustrating a counter-sink constructed in accordance with an embodiment of my invention in applied position;

Fig. 2 is an enlarged longitudinal sectional view taken through my improved counter-sink as herein embodied; and Fig. 3 is a view in top plan of the counter-sink as herein set forth.

As disclosed in the accompanying drawings, D denotes a conventional drill adapted to be engaged with the chuck C of a brace.

My improved counter-sink comprises a tubular member 1 through which the drill D is adapted to be directed and has its working end provided with the cutting points 2. The opposite end of the member 1 is provided with the gradually reduced shank 3 preferably rectangular in cross section with the portions thereof adjacent the body 1 proper provided in its periphery with the annular groove or channel 4 adapted to facilitate the action of the jaws C of the chuck C for clamping the counter-sink in applied position.

It is to be noted that the shank 3, intermediate its longitudinal edges $3^a$, is split, as indicated at 5, in perpendicularly related planes whereby said shank 3 is capable of compression under the influence of the jaws C of the chuck C for effecting the requisite clamping action upon the drill D, whereby it will be perceived that the drill D and the counter-sink may be locked by the jaws C of the chuck C at a single operation.

As above stated, the elongated annular recess 4 is to provide for the engagement of the counter-sinking tool with the jaws of an ordinary hand brace. This annular recess 4 is absolutely necessary in order that the counter-sink may be held within the jaws of the brace and securely hold the drill. Furthermore this annular recess 4 is of considerable value where the drill is to be used in close quarters, as if the shank of the counter-sink was of the same diameter as the lower portion of the counter-sink it would be impossible to work in these close quarters. Thus for instance if it be desired to drill perforations through the lower rail of an object having parallel rails set rather close together, then the recess 4 accommodates the uppermost rail and permits the drill to pass through the lowermost rail with the axis of the drill nearly if not entirely vertical, whereas if the shank was of uniform diameter and not recessed this would be impossible and the drill would be held at a greater angle to the lower rail than if the shank were recessed. It is pointed out also that by making the upper portion of the shank many sided, the counter-sinking tool is positively engaged with the brace so as to rotate therewith and so that there shall be no possible slip and that inasmuch as the slits 5 extend inward between the corners of the square portion of the shank, the jaws of the drill will not engage across the slits 5 but will engage opposite sections of the shank and force these sections positively inward.

From the foregoing description, it is thought to be obvious that a counter-sink constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice except as required by the scope of the appended claim.

I claim:

A counter-sinking attachment for drills comprising a tubular body, the bore of which has a uniform diameter for the entire length of the body, one end of the body being cylindrical and having its extremity formed to provide cutters, the body above said cylindrical portion being reduced in diameter to provide an elongated annular recess, the body above the recess being transversely enlarged and upwardly tapered, said upwardly tapered portion being many sided in cross section, the reduced portion and the many sided portion of the body together forming a shank and being divided by longitudinal slits, the slits intersecting the bore and being disposed mid-way between the corners of the square portion of the shank.

In testimony whereof I hereunto affix my signature in the presence of two witnesses.

VICTOR AHLGREN.

Witnesses:
RUDOLPH L. BELDAHL,
CHAS. R. KELLSTROM.